United States Patent
Chun et al.

(10) Patent No.: US 9,710,106 B2
(45) Date of Patent: Jul. 18, 2017

(54) TOUCH SCREEN DISPLAY DEVICE AND DRIVING METHOD THEREOF

(71) Applicant: SAMSUNG DISPLAY CO., LTD., Yongin, Gyeonggi-Do (KR)

(72) Inventors: Byung-Ki Chun, Yongin (KR); Won-Woo Jang, Yongin (KR); Jeong-Hun So, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 51 days.

(21) Appl. No.: 14/741,309

(22) Filed: Jun. 16, 2015

(65) Prior Publication Data
US 2016/0179269 A1 Jun. 23, 2016

(30) Foreign Application Priority Data

Dec. 23, 2014 (KR) .......................... 10-2014-0187261

(51) Int. Cl.
*G06F 3/041* (2006.01)
*G09G 3/20* (2006.01)

(52) U.S. Cl.
CPC .......... *G06F 3/0418* (2013.01); *G06F 3/0412* (2013.01); *G09G 3/20* (2013.01); *G09G 2320/0257* (2013.01)

(58) Field of Classification Search
CPC ................ G06F 3/0418; G06F 3/0412; G09G 2320/0257; G09G 3/20
See application file for complete search history.

(56) References Cited

U.S. PATENT DOCUMENTS 7,764,294 B2 * 7/2010 Lee ....................... G09G 3/2011
345/690
8,836,657 B2 9/2014 Yamamoto et al.
(Continued)

FOREIGN PATENT DOCUMENTS

JP 10-2011-065301 A 3/2011
KR 10-2004-0026059 A 3/2004
(Continued)

OTHER PUBLICATIONS

EPO Search Report dated May 24, 2016, for corresponding European Patent application 15201698.6, (7 pages).
(Continued)

*Primary Examiner* — Claire X Pappas
*Assistant Examiner* — Gerald Oliver
(74) *Attorney, Agent, or Firm* — Lewis Roca Rothgerber Christie LLP

(57) ABSTRACT

According to aspects of embodiments of the present invention a touch screen display device includes: a touch sensor; a touch controller configured to detect a position touched on the touch sensor; and a touch correcting unit configured to correct an initial touch position detected by the touch controller to a final touch position, wherein the touch correcting unit comprises: a first computing unit configured to convert the initial touch position to a temporary touch position; a second computing unit configured to compute a touch movement amount between the initial touch position and the temporary touch position; and a third computing unit configured to compute the final touch position by subtracting the touch movement amount from the initial touch position.

16 Claims, 9 Drawing Sheets

(56) References Cited

U.S. PATENT DOCUMENTS

| | | | |
|---|---|---|---|
| 2006/0061582 A1 | 3/2006 | Kurupati et al. | |
| 2008/0001973 A1 | 1/2008 | Willis | |
| 2012/0287252 A1 | 11/2012 | Tsuchida | |
| 2013/0083244 A1* | 4/2013 | Hosaka | G09G 3/3648 348/571 |
| 2014/0176498 A1 | 6/2014 | Yanase et al. | |

FOREIGN PATENT DOCUMENTS

| | | | | |
|---|---|---|---|---|
| KR | 10-2005-0048300 A | | 5/2005 | |
| KR | 10-2007-0010710 A | | 1/2007 | |
| KR | 10-2007-0018935 | | 2/2007 | |
| KR | 10-2007-0067093 | | 6/2007 | |
| KR | 10-2012-0114145 | | 10/2012 | |
| KR | 10-2013-0017603 | * | 2/2013 | G09G 3/30 |

OTHER PUBLICATIONS

EPO Extended Search Report dated Sep. 6, 2016, for corresponding European Patent Application No. 15201698.6 (12 pages).

* cited by examiner

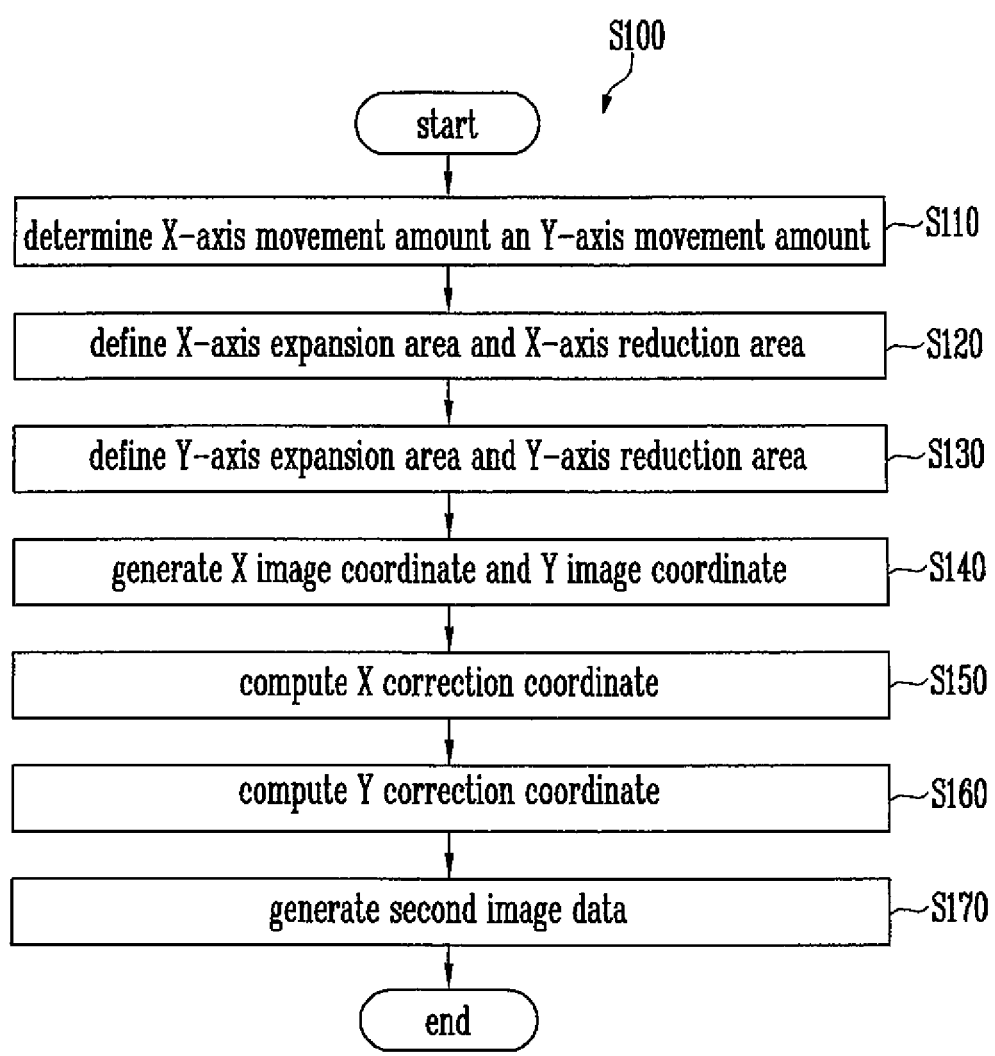

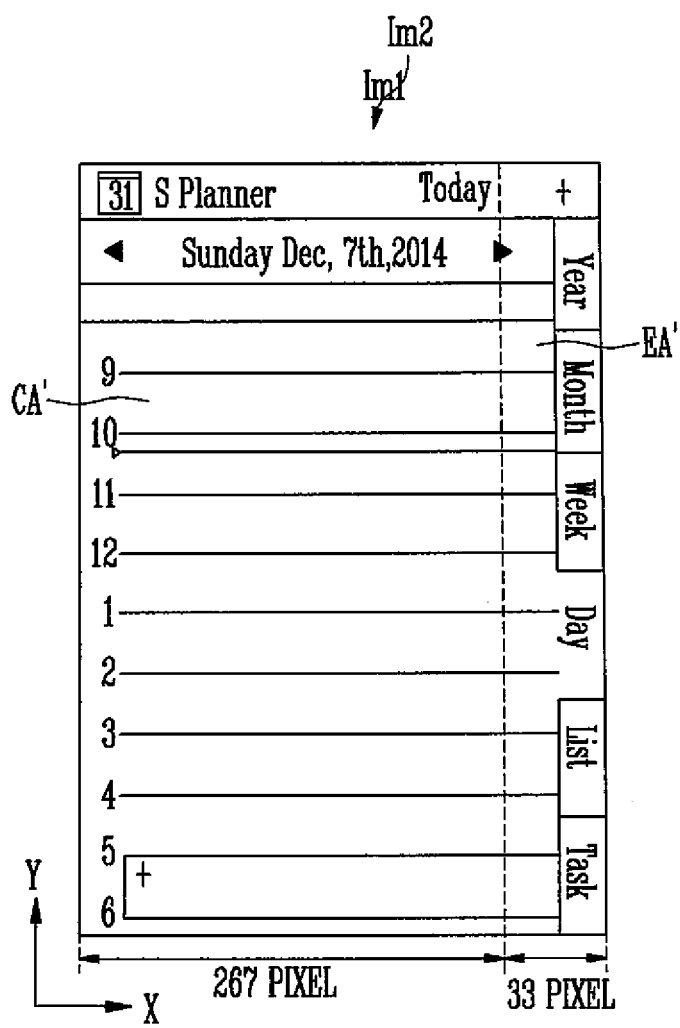

TOUCH SCREEN DISPLAY DEVICE AND DRIVING METHOD THEREOF

CROSS-REFERENCE TO RELATED APPLICATION

This application claims priority to and the benefit of Korean Patent Application No. 10-2014-0187261, filed on Dec. 23, 2014, in the Korean Intellectual Property Office, the entire content of which is incorporated herein by reference in its entirety.

BACKGROUND

1. Field

Aspects of embodiments of the present invention relate to a touch screen display device and a method for manufacturing the same.

2. Description of the Related Art

Recently, a variety of display devices such as organic light emitting display devices, liquid crystal display devices, and plasma display devices have been widely used.

Meanwhile, to facilitate user interaction with display devices, touch screen functionality may be added to display devices.

A display device may include a touch sensor for detecting the location where touch is made. For example, capacitive touch sensor, resistive touch sensor, optical touch sensor, and the like may be used.

SUMMARY

According to aspects of embodiments of the present invention a touch screen display device includes: a touch sensor; a touch controller configured to detect a position touched on the touch sensor; and a touch correcting unit configured to correct an initial touch position detected by the touch controller to a final touch position, wherein the touch correcting unit comprises: a first computing unit configured to convert the initial touch position to a temporary touch position; a second computing unit configured to compute a touch movement amount between the initial touch position and the temporary touch position; and a third computing unit configured to compute the final touch position by subtracting the touch movement amount from the initial touch position.

The first computing unit may be configured to compute an X temporary coordinate of the temporary touch position based on an X initial coordinate of the initial touch position and to compute a Y temporary coordinate of the temporary touch position based on a Y initial coordinate of the initial touch position, the second computing unit may be configured to compute a X-axis touch movement amount between the X initial coordinate of the initial touch position and the X temporary coordinate of the temporary touch position and to compute a Y-axis touch movement amount between the Y initial coordinate of the initial touch position and the Y temporary coordinate of the temporary touch position, and the third computing unit may be configured to compute an X final coordinate of the final touch position by subtracting the X-axis touch movement amount from the X initial coordinate of the initial touch position and to compute a Y final coordinate of the final touch position by subtracting the Y-axis touch movement amount from the Y initial coordinate of the initial touch position.

The touch screen display device may further include a display panel; a display driver configured to display a first image on the display panel using first image data and to display a second image on the display panel using second image data; and an image correcting unit configured to convert the first image data into the second image data.

The image correcting unit may include: a coordinate generator configured to generate an X image coordinate and a Y image coordinate of values included in the first image data; an X-axis area defining unit configured to divide an X axis of the first image into an X-axis expansion area and an X-axis reduction area; and an X coordinate correcting unit configured to compute an X correction coordinate using a first mathematical formula if the X image coordinate is positioned in the X-axis expansion area and compute an X correction coordinate using a second mathematical formula if the X image coordinate is positioned in the X-axis reduction area.

The image correcting unit may further include: a Y-axis area defining unit configured to divide a Y-axis of the first image into a Y-axis expansion area and a Y-axis reduction area; and a Y coordinate correcting unit configured to compute a Y correction coordinate using a third mathematical formula if the Y image coordinate is positioned in the Y-axis expansion area and compute a Y correction coordinate using a fourth mathematical formula if the Y image coordinate is positioned in the Y-axis reduction area.

The image correcting unit may further include an image data generator configured to generate the second image by mapping a value of the first image to a correction coordinate comprising the X correction coordinate and the Y correction coordinate, the value of the first image corresponding to the correction coordinate.

The image correcting unit may further include a memory configured to store the first image data.

The image correcting unit may further include a movement amount determining unit configured to determine an X-axis movement amount, a Y-axis movement amount, an X-axis scaling ratio and a Y-axis scaling ratio of the first image.

The X-axis defining unit may be configured to divide the X axis of the first image into the X-axis expansion area and the X-axis reduction area of the first image based on the X-axis movement amount and the X-axis scaling ratio, and the Y-axis defining unit may be configured to divide the Y axis of the first image into the Y-axis expansion area and the Y-axis reduction area of the first image based on the Y-axis movement amount and the Y-axis scaling ratio.

The X-axis expansion area may be determined by multiplying the X-axis movement amount and the X-axis scaling ratio, the X-axis reduction area may be an area that is not the X-axis expansion area, the Y-axis expansion area may be determined by multiplying the Y-axis movement amount and the Y-axis scaling ratio, and the Y-axis reduction area may be an area that is not the Y-axis expansion area.

The X coordinate correcting unit may be configured to compute the X correction coordinates that are more in number than the X image coordinates using the first mathematical formula if the X image coordinate is positioned in the X-axis expansion area and to compute the X correction coordinates that are fewer in number than the X image coordinates using the second mathematical formula if the X image coordinate is positioned in the X-axis reduction area; and the Y coordinate correcting unit may be configured to compute the Y correction coordinates that are more in number than the Y image coordinates using the third mathematical formula if the Y image coordinate is positioned in the Y-axis expansion area and to compute the Y correction coordinates that are fewer in number than the Y image coordinates using the fourth mathematical formula if the Y image coordinate is positioned in the Y-axis reduction area.

The first computing unit may be configured to compute the X temporary coordinate of the temporary touch position using the first mathematical formula if the X initial coordinate of the initial touch position is positioned in the X-axis expansion area, to compute the X temporary coordinate of the temporary touch position using the second mathematical formula if the X initial coordinate of the initial touch position is in the X-axis reduction area, to compute the Y temporary coordinate of the temporary touch position using the third mathematical formula if the Y initial coordinate of the initial touch position is in the Y-axis expansion area, and to compute the Y temporary coordinate of the temporary touch position using the fourth mathematical formula if the Y initial coordinate of the initial touch position is in the Y-axis reduction area.

According to aspects of embodiments of the present invention, in a method of driving a touch screen display device, the method includes: converting first image data for implementing a first image into second image data; and correcting an initial touch position detected by a touch sensor to a final touch position.

The converting the first image data into the second image data may include: determining an X-axis movement amount, a Y-axis movement amount, an X-axis scaling ratio, and a Y-axis scaling ratio of the first image; defining an X axis of the first image into a X-axis expansion area and a X-axis reduction area based on the X-axis movement amount and the X-axis scaling ratio; defining a Y axis of the first image into a Y-axis expansion area and a Y-axis reduction area based on the Y-axis movement amount and the Y-axis scaling ratio; generating an X image coordinate and a Y image coordinate of values included in the first image data; computing an X correction coordinate using a first mathematical formula if the X image coordinate is positioned in the X-axis expansion area and computing a X correction coordinate using a second mathematical formula if the X image coordinate is positioned in the X-axis reduction area; computing a Y correction coordinate using a third mathematical formula if the Y image coordinate is positioned in the Y-axis expansion area and computing a Y correction coordinate using a fourth mathematical formula if the Y image coordinate is positioned in the Y-axis reduction area; and generating the second image data by mapping a value of the first image data to a correction coordinate comprising the X correction coordinate and the Y correction coordinate, the value of the first image corresponding to the correction coordinate.

The correcting the initial touch position to the final touch position may include: computing an X temporary coordinate of the temporary touch position from an X initial coordinate of the initial touch position and computing a Y temporary coordinate of the temporary touch position from a Y initial coordinate of the initial touch position; computing an X-axis touch movement amount between the X initial coordinate of the initial touch position and the X temporary coordinate of the temporary touch position and computing a Y-axis touch movement amount between the Y initial coordinate of the initial touch position and the Y temporary coordinate of the temporary touch position; and computing an X final coordinate of the final touch position by subtracting the X-axis touch movement amount from the X initial coordinate of the initial touch position and computing a Y final coordinate of the final touch position by subtracting the Y-axis touch movement amount from the Y initial coordinate of the initial touch position.

The computing the X temporary coordinate and the Y temporary coordinate of the temporary touch position may include computing the X temporary coordinate of the temporary touch position using the first mathematical formula if the X initial coordinate of the initial touch position is positioned in the X-axis expansion area, computing the X temporary coordinate of the temporary touch position using the second mathematical formula if the X initial coordinate of the initial touch position is in the X-axis reduction area, computing the Y temporary coordinate of the temporary touch position using the third mathematical formula if the Y initial coordinate of the initial touch position is in the Y-axis expansion area, and computing the Y temporary coordinate of the temporary touch position using the fourth mathematical formula if the Y initial coordinate of the initial touch position is in the Y-axis reduction area.

The X-axis expansion area may be determined by multiplying the X-axis movement amount and the X-axis scaling ratio, the X-axis reduction area may be an area that is not the X-axis expansion area, the Y-axis expansion area may be determined by multiplying the Y-axis movement amount and the Y-axis scaling ratio, and the Y-axis reduction area may be an area that is not the Y-axis expansion area.

The X correction coordinates computed from X image coordinates positioned in the X-axis expansion area may be more in number than the X image coordinates positioned in the X-axis expansion area, and the X correction coordinates computed from the X image coordinates positioned in the X-axis reduction area may be fewer than the X image coordinates positioned in the X-axis reduction area.

The computing the Y correction coordinate may include computing the Y correction coordinates that are more in number than the Y image coordinates using the third mathematical formula if the Y image coordinate is positioned in the Y-axis expansion area and computing the Y correction coordinates that are fewer in number than the Y image coordinates using the fourth mathematical formula if the Y image coordinate is positioned in the Y-axis reduction area.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be more thorough and more complete, and will more fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 illustrates a method of correcting image by the image correcting unit shown in FIG. 3.

FIGS. 5A to 5D illustrate an embodiment in which image correction is performed by the image correcting method shown in FIG. 4.

DETAILED DESCRIPTION

Figure 1:
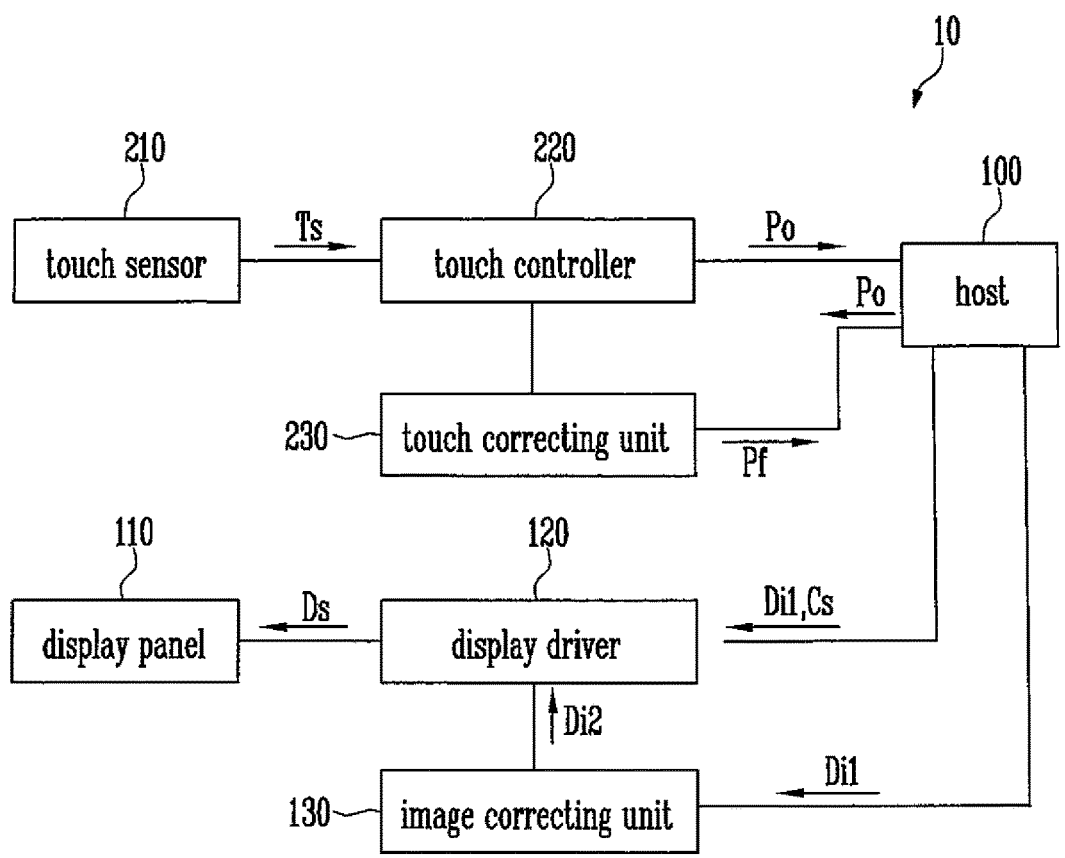
FIG. 1 illustrates a touch screen display device according to embodiments of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, it will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a touch screen display device according to embodiments of the present invention.

Referring to FIG. 1, a touch screen display device 10 according to embodiments of the present invention may include a host 100, a display panel 110, a display driver 120, an image correcting unit (or image corrector) 130, a touch sensor 210, a touch controller 220, and a touch correcting unit (or touch corrector) 230.

The host 100 may supply image data Di1 to the display driver 120 and the image correcting unit 130.

The host 100 may also supply a control signal Cs along with the image data Di1 to the display driver 120.

The control signal Cs may include a vertical synchronization signal, a horizontal synchronization signal, a data enable signal, a clock signal, and the like.

The host 100 may also supply the control signal Cs to the image correcting unit 130.

For example, but without limitation thereto, the host 100 may include a processor, a graphic processing unit, a memory and the like.

The display panel 110 may display an image (e.g., a predetermined image) by including a plurality of pixels P. For example, but without limitation thereto, the display penal 110 may display a first image and a second image and the like depending on control of the display driver 120.

The display panel 110 may be implemented with an organic light emitting display panel, a liquid crystal display panel, a plasma display panel and the like, but is not limited thereto.

Subsequently, with reference to FIG. 2, the display panel 110 may be described more in detail.

The display driver 120 may control image display operations of the display panel 110 by supplying a driving signal Ds to the display panel 110.

For example, but without limitation thereto, the display driver 120 may generate the driving signal Ds using image data Di1 and Di2 and the control signal Cs that are supplied from an external device.

The display driver 120 may display the first image on the display panel 110 using the first image data Di1 that is supplied from an external device.

The display driver 120 may receive the first image data Di1 for implementing the first image from the host 100.

The display driver 120 may display the second image on the display panel 110 using the second image data Di2 that is supplied from an external device.

The display driver 120 may receive the second image data Di2 for implementing the second image from the image correcting unit 130.

Subsequently, with reference to FIG. 2, the display driver 120 may be described more in detail.

The image correcting unit 130 may convert the first image data Di1 that is supplied from an external device into the second image data Di2. The image correcting unit 130 may supply the second image data Di2 to the display driver 120.

The image correcting unit 130 may receive the first image data Di1 from the host 100.

The image correcting unit 130 may be separately installed from the display driver 120, as shown in FIG. 1.

In another embodiment, the image correcting unit 130 may be integrated into the display driver 120 or the host 100.

A display device that outputs a certain image or character continuously for a long time may display afterimages due to certain pixels being degraded. In order to solve this problem, image may be displayed by moving the image on the display panel.

The display may move in constant cycles or in inconsistent cycles. The image may move in a consistent direction (such as clockwise or counterclockwise) or may move in inconsistent directions. If the image is displayed by being moved, a portion of the image may disappear from the display panel, or there may be an area in which image is not displayed in a portion of the display panel, that is, there may be a blank area.

If the image is displayed by moving five (5) pixels to the left, the five (5) pixels on the left side of the image may disappear from the display panel, and the five (5) pixels on the right side of the display panel may be a blank area (e.g., such that no portion of an image is displayed).

The image correcting unit 130 according to example embodiments of the present invention may overcome the problem described above, which will be subsequently described in more detail with reference to FIG. 3.

The touch sensor 210 may be configured to detect touch made by the user, generate a touch signal Ts, and to supply the touch signal Ts to the touch controller 220. The touch sensor 210 may be accessed to the touch controller 220.

The touch sensor 210 may sense touch made by a body part of the user (for example, a finger), a stylus and the like.

The touch may be made by the user's finger (e.g., or other touch input device such as a stylus) directly contacting the touch screen display device 10 or by the user's finger and the like approaching the touch screen display device 10.

For example, but without limitation thereto, the touch sensor 210 may be implemented with any one of a capacitive type touch sensor, a resistive type touch sensor, an optical touch sensor, a surface acoustic wave touch sensor, a pressure touch sensor, a hybrid touch sensor and the like.

The hybrid touch sensor may be implemented by the same kind of touch sensors being coupled to each other or a variety of touch sensors being coupled to each other.

The touch sensor 210 used in an embodiment is not however limited to the above-described types and may be implemented with a sensor configured to detect touch made by a finger or a tool regardless of the type.

The touch controller 220 may detect a position Po of touch made, using the touch signal Ts supplied from the touch sensor 210.

The touch controller 220 may transmit an initial touch position Po that is detected by the host 100. (For convenience, the touch position Po detected by the touch controller 220 will be referred to as the initial touch position Po.)

The host 100 may transmit the initial touch position Po to the touch correcting unit 230.

In another embodiment, the touch controller 220 may supply the initial touch position Po detected by the touch controller 220 directly to the touch correcting unit 230 without going through the host 100.

The touch sensor 210 may be separately positioned from the display panel 110, as shown in FIG. 1.

In another embodiment, the touch sensor 210 may be integrated into the display panel 110. The touch controller 220 may be integrated into the display driver 120.

The touch correcting unit 230 may, in order to overcome touch error that may occur when performing a pixel shift operation that displays image by moving the image, correct the initial touch position Po that is detected by the touch controller 220 to a final touch position Pf.

The touch correcting unit 20 may transmit the final touch position Pf that is computed to the host 100.

The touch correcting unit 230 will be described in more detail with reference to FIG. 3.

Figure 2:
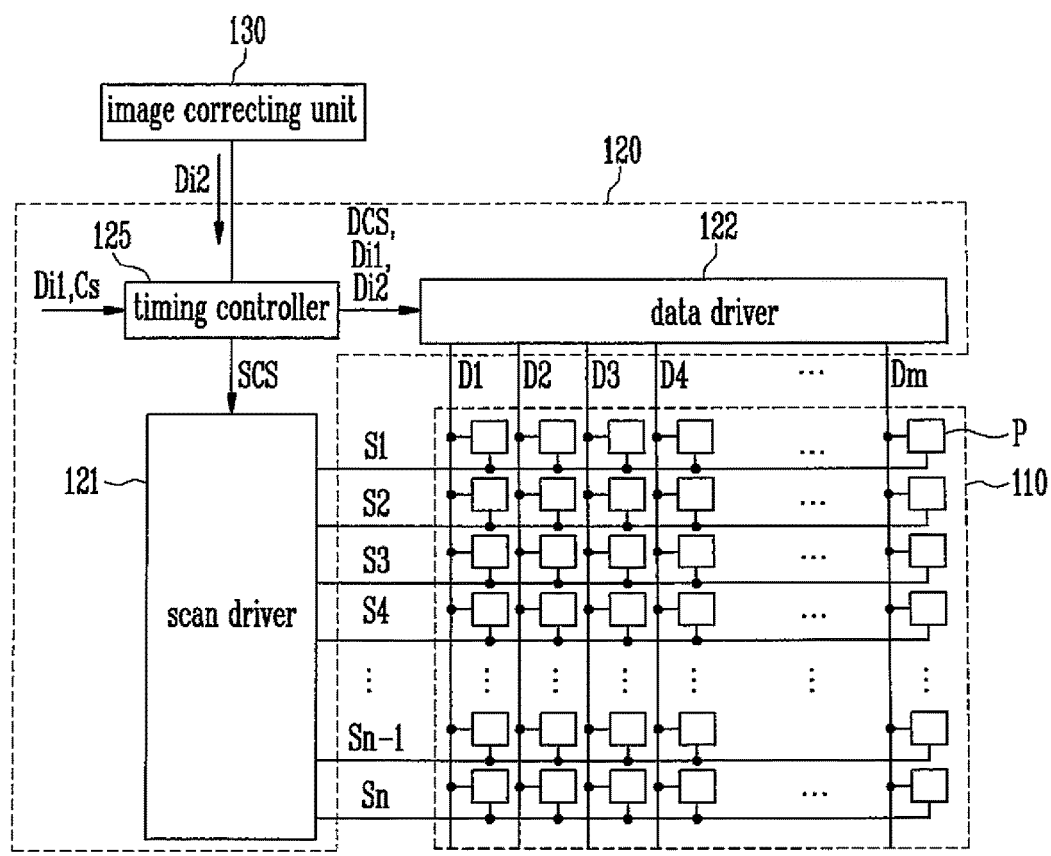
FIG. 2 illustrates a display panel, a display driver and an image correcting unit according to embodiments of the present invention.

FIG. 2 illustrates a display panel, a display driver, and an image correcting unit according to embodiments of the present invention.

Referring to FIG. 2, the display panel 110 may include a plurality of data lines D1 to Dm, a plurality of scan lines S1 to Sn and a plurality of pixels P.

The pixels P may be coupled to the data lines D1 to Dm and the scan lines S1 to Sn. For example, but without limitation thereto, the pixels P may be arranged at a crossing region of the data lines D1 to Dm and the scan lines S1 to Sn in a matrix arrangement.

Each of the pixels P may receive a data signal and a scan signal through the data lines D1 to Dm and the scan lines S1 to Sn.

The display driver 120 may include a scan driver 121, a data river 122 and a timing controller 125. The driving signal Ds of the display driver 120 may include a scan signal and a data signal.

The scan driver 121 may supply scan signals to the scan lines S1 to Sn in response to a scan timing control signal SCS. For example, but without limitation, the scan driver 121 may supply scan signals sequentially to the scan lines S1 to Sn.

The scan driver 121 may be electrically coupled to the scan lines S1 to Sn positioned at the display panel 110 through a separate component.

In another embodiment, the scan driver 121 may be directly mounted in the display panel 110.

The data driver 122 may generate data signals by receiving a data timing control signal DCS, the image data Di1 and Di2 from the timing controller 125.

The data driver 122 may supply data signals that are generated to the data lines D1 to Dm.

The data driver 122 may be electrically coupled to the data lines D1 to Dm positioned at the display panel 110 through a separate component.

In another embodiment, the data driver 122 may be directly mounted in the display panel 110.

The pixels P that receive the data signals through the data lines D1 to Dm may emit light having a brightness that corresponds to the data signals.

For example, but without limitation, if the timing controller 125 supplies the first image data Di1, the data driver 122 may display the first image by supplying data signals that correspond to the first image data Di1 to the pixels P.

If the timing controller 125 supplies the second image data Di2, the data driver 122 may display the second image by supplying data signals that correspond to the second image data Di2 to the pixels P.

As illustrated in FIG. 2, the data driver 122 may be separately positioned from the scan driver 121.

In another embodiment, the data driver 122 may be integrated into the scan driver 121.

The timing controller 125 may receive the first image data Di1 and the control signal C from the host 100.

The timing controller 125 may generate timing control signals for controlling the scan driver 121 and the data driver 122 based on the control signal Cs.

For example, but without limitation thereto, the timing control signals may include a scan timing control signal SCS for controlling the scan driver 121 and a data timing control signal DCS for controlling the data driver 122.

The timing controller 125 may supply the scan timing control signal SCS to the scan driver 121 and the data timing control signal DCS to the data driver 122.

The timing controller 125 may receive the second image data Di2 from the image correcting unit 130.

For example, but without limitation, the timing controller 125 may display the first image by supplying the first image data Di1 to the data driver 122 during a first period and may supply the second image data Di2 to the data driver 122 during a second period.

The timing controller 125 may convert the image data Di1 and Di2 according to specification of the data driver 122 and supply them to the data driver 122.

The image correcting unit 130 may, as illustrated in FIG. 2, be separately positioned from the timing controller 125.

In another embodiment, the image correcting unit 130 may be integrated into the timing controller 125.

Figure 3:
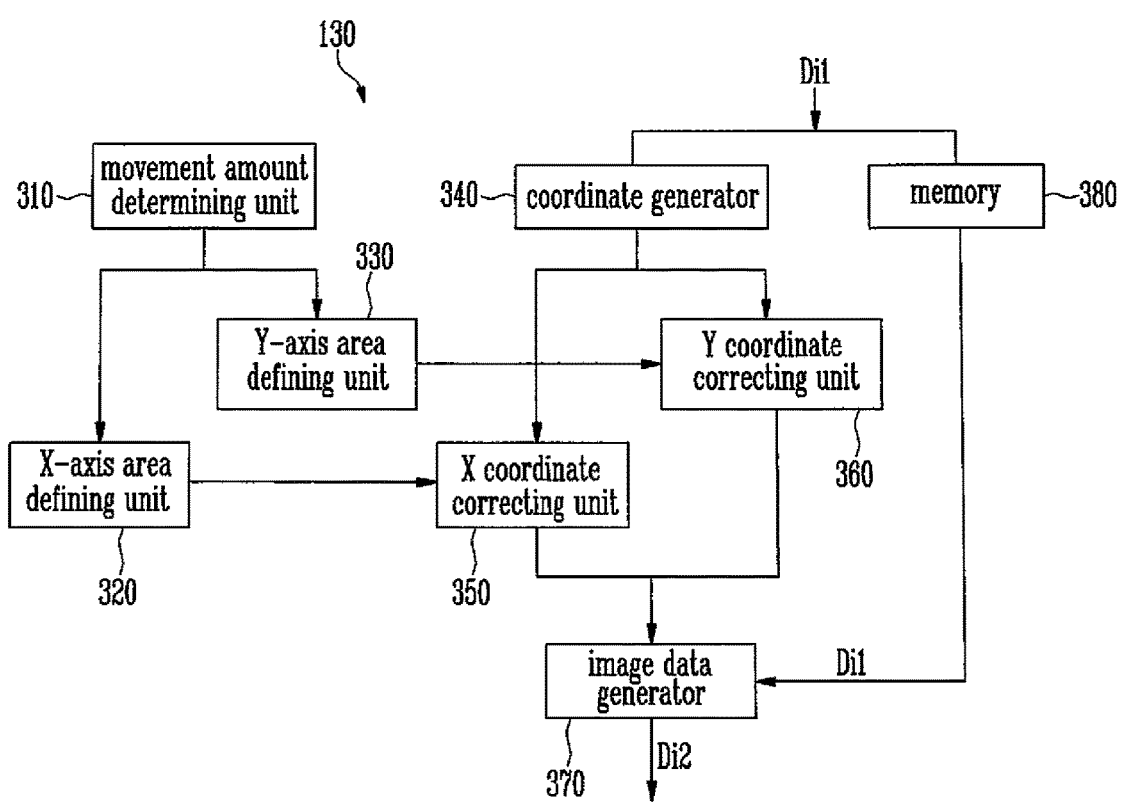
FIG. 3 illustrates an image correcting unit according to embodiments of the present invention.

FIG. 3 illustrates an image correcting unit according to embodiments of the present invention. FIG. 4 illustrates a method of correcting image by the image correcting unit shown in FIG. 3. FIGS. 5A to 5D illustrate an embodiment in which image correction is performed by the image correcting method shown in FIG. 4.

Referring to FIG. 3, the image correcting unit 130 according to embodiments of the present invention may include a movement amount determining unit 310, a X-axis area defining unit 320, a Y-axis area defining unit 330, a coordinate generator 340, a X coordinate correcting unit 350, a Y coordinate correcting unit 360, an image data generator 370 and a memory 380.

The movement amount determining unit 310 may determine an X-axis movement amount and a Y-axis movement amount of a first image Im1 when displaying the first image Im1 on the display panel 110 by moving the first image Im1.

The X-axis may represent a horizontal axis of the display panel 110. The Y-axis may represent an axis in a direction vertical to the X axis (e.g., a vertical axis of the display panel).

In an embodiment, the X-axis movement amount and the Y-axis movement amount of the first image Im1 may be preconfigured and may be input into the touch screen display device 10.

For example, but without limitation thereto, the first image Im1 may move by frame unit. The movement amount determining unit 310 may determine the X-axis movement amount and the Y-axis movement amount based on a vertical synchronization signal of the first image Im1.

In another embodiment, the X-axis movement amount and the Y-axis movement amount of the first image Im1 may be input by the user. For example, but without limitation thereto, the user may input the X-axis movement amount, the Y-axis movement amount, a moving cycle, a moving direction and the like of the first image Im1.

The movement amount determining unit 310 may determine a X-axis scaling ratio and a Y-axis scaling ratio.

For example, but without limitation thereto, the movement amount determining unit 310 may determine the X-axis scaling ratio and the Y-axis scaling ratio based on the vertical synchronization signal of the first image Im1.

In another embodiment, the X-axis scaling ratio and the Y-axis scaling ratio of the first image Im1 may be input by the user.

The X-axis area defining unit 320 may define X axis of the first image Im1 into a X-axis expansion area and a X-axis reduction area based on the X-axis movement amount and the X-axis scaling ratio determined by the movement amount determining unit 310.

For example, but without limitation thereto, the X-axis expansion area may be determined by finding an area of the X-axis expansion area by multiplying the X-axis movement amount and the X-axis scaling ratio and by setting a position of the X-axis expansion area based on a X-axis movement direction.

The X-axis reduction area may be defined as an area that is not the X-axis expansion area.

The Y-axis area defining unit 330 may define Y axis of the first image Im1 into a Y-axis expansion area and a Y-axis reduction area based on Y-axis movement amount and Y-axis scaling ratio determined by the movement amount determining unit 310.

For example, but without limitation thereto, the Y-axis expansion area may be determined by finding an area of the Y-axis expansion area by multiplying the Y-axis movement amount and the Y-axis scaling ratio and by setting a position of the Y-axis expansion area based on Y-axis movement direction.

The Y-axis reduction area may be defined as an area that is not the Y-axis expansion area.

The coordinate generator 340 may generate a X image coordinate and Y image coordinate of values included in the first image data Di1 for implementing the first image Im1. (The X coordinate and the Y coordinate generated by the coordinate generator 340 may be referred to as X image coordinate and Y image coordinate, respectively.)

The coordinate generator 340 may receive the first image data Di1 and the control signal Cs from the host 100.

For example, but without limitation thereto, the coordinate generator 340 may generate X image coordinate and Y image coordinate of values included in the first image data Di1 using a vertical synchronization signal, a horizontal synchronization signal, a data enable signal, a clock signal and the like.

The X coordinate correcting unit 350 may compute X correction coordinate by applying different mathematical formula depending on where the X image coordinate of a certain value that is included in the first image data Di1 is positioned, whether in the X-axis expansion area or the X-axis reduction area.

For example, but without limitation thereto, the X coordinate correcting unit 350 may compute the X correction coordinate using a first mathematical formula if the X image coordinate is positioned in the X-axis expansion area and may compute the X correction coordinate using a second mathematical formula if the X image coordinate is positioned in the X-axis reduction area.

The X coordinate correcting unit 350 may compute the X correction coordinates of all of the values included in the first image data Di1 through the above-described process.

Because the X-axis expansion area is an area to which area will expand in a X-axis direction in a second image Im2, there may be more X correction coordinates that are computed from the X image coordinates positioned in the X-axis expansion area than the X image coordinates positioned in the X-axis expansion area.

Because the X-axis reduction area is an area to which 면적 will expand in a X-axis direction in the second image Im2, there may be more X correction coordinates computed from the X image coordinates positioned in the X-axis reduction area than the X image coordinates positioned in the X-axis reduction area.

The X correction coordinate computed by the X coordinate correcting unit 350 may be transferred to the image data generator 370.

The Y coordinate correcting unit 360 may compute Y correction coordinate by applying a different mathematical formula depending on where the Y image coordinate of a certain value that is included in the first image data Di1 is positioned, whether in the Y-axis expansion area or the Y-axis reduction area.

For example, but without limitation thereto, the Y coordinate correcting unit 360 may compute the Y correction coordinate using a third mathematical formula if the Y image coordinate is positioned in the Y-axis expansion area and may calculate the Y correction coordinate using a fourth mathematical formula I the Y image coordinate is positioned in the Y-axis reduction area.

The Y coordinate correcting unit 360 may compute the Y correction coordinates of all of the values included in the first image data Di1 through the above-described process.

Because the Y-axis expansion area is a region in which an area will expand in Y-axis direction in the second image Im2, there may be more Y correction coordinates that are computed from the Y image coordinates positioned in the Y-axis expansion area than the Y image coordinates positioned in the Y-axis expansion area.

Because the Y-axis reduction area is a region in which an area will expand in Y-axis direction in the second image Im2, there may be more Y correction coordinates computed from the Y image coordinates positioned in the Y-axis reduction area than the Y image coordinates positioned in the Y-axis reduction area.

The Y correction coordinate computed by the Y coordinate correcting unit 360 may be transferred to the image data generator 370.

The memory 380 may store the first image data Di1 that is supplied from the host 100.

The image data generator 370 may receive the X correction coordinate from the X coordinate correcting unit 350 and the Y correction coordinate from the Y coordinate correcting unit 360. The image data generator 370 may receive the first image data Di1 from the memory 380.

The image data generator 370 may generate the second image data Di2 by mapping a value that is included in the first image data Di1 to a correction coordinate consisting of or comprising the X correction coordinate and the Y correction coordinate.

For example, but without limitation thereto, if the X image coordinate of a certain value included in the first image data Di1 is x1, x1 may be transferred to the X coordinate correcting unit 350 and may be computed as x2 which is the X correction coordinate. If the Y image coordinate of a certain value included in the first image data Di1 is y1, y1 may be transferred to the Y coordinate correcting unit 360 and may be computed as y2 which is the Y correction coordinate.

The image data generator 370 may map a value of the first image data Di1 which corresponds to an image coordinate (x1, y1) to a correction coordinate (x2, y2).

Through such methods, all of the values that are included in the first image data Di1 may be converted into correction coordinates of the image coordinates, and by mapping the values included in the first image data Di1 to each of the correction coordinates, the second image data Di2 made of the values mapped to the correction coordinates may be generated.

Although in FIG. 3, the movement amount determining unit 310, the X-axis area defining unit 320, the Y-axis area defining unit 330, the coordinate generator 340, the X coordinate correcting unit 350, the Y coordinate correcting unit 360, the image data generator 370 and the memory are illustrated as separate components, in another embodiment, at least two components may be integrated into one component.

Referring to FIG. 4, a step of converting the first image data Di1 by the image correcting unit 130 into the second image data Di2 (S100) may include a step of determining the X-axis movement amount and the Y-axis movement amount (S110), a step of defining the X-axis expansion area and the X-axis reduction area (S120), a step of defining the Y-axis expansion area and the Y-axis reduction area (S130), a step of generating the X image coordinate and the Y image coordinate (S140), a step of computing the X correction coordinate (S150), a step of computing the Y correction coordinate (S160) and a step of generating the second image data.

In the step of determining the X-axis movement amount and the Y-axis movement amount (S110), the X-axis movement amount, the Y-axis movement amount, the X-axis scaling ratio and the Y-axis scaling ratio may be determined.

The X-axis movement amount and the Y-axis movement amount may include a movement direction.

For example, but without limitation thereto, supposing the X-axis movement amount is mx, if mx is greater than 0, the first image Im1 may move to the right side, and if mx is less than 0, the first image Im1 may move to the left side. Supposing the Y-axis movement amount is my, if my is greater than 0, the first image Im1 may move to the upper side, and if my is less than 0, the first image Im1 may move to the lower side.

The step of determining the X-axis movement amount and the Y-axis movement amount (S110) may be performed by the movement amount determining unit 310 as previously described.

Figure 5A:
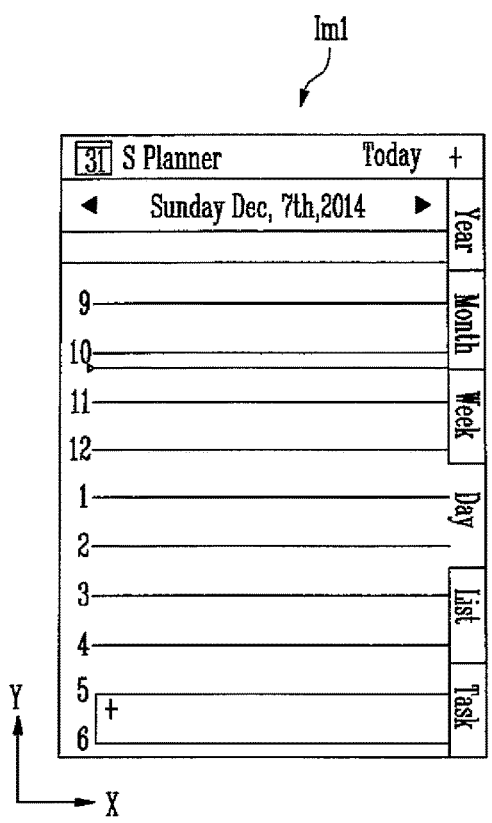

Referring to FIG. 5A, the first image Im1 may be displayed on the display panel 110 of the touch screen display device 10.

In order to prevent afterimages from occurring on the display panel 110, the first image Im1 may be displayed by being moved.

The X axis may represent the horizontal axis of the display panel 110, and the Y axis may represent an axis that is vertical to the X axis (e.g., the vertical axis of the display panel 110).

For example, but without limitation thereto, the first image Im1 may move three (3) pixels to the left direction.

In the step of defining the X-axis expansion area and the X-axis reduction area (S120), X axis of the first image Im1 may be defined as the X-axis expansion area and the X-axis reduction area based on the X-axis movement amount and the X-axis scaling ratio.

The X-axis expansion area of the second image Im2 may be expanded by an area that is as large as the X-axis expansion area of the first image Im1 plus the X-axis movement amount. The X-axis reduction area of the second image Im2 may be reduced to an area that is as large as the X-axis reduction area of the first image Im1 minus the X-axis movement amount.

The step of defining the X-axis expansion area and the X-axis reduction area (S120) may be performed by the X-axis area defining unit 320 as described above.

Figure 5B:
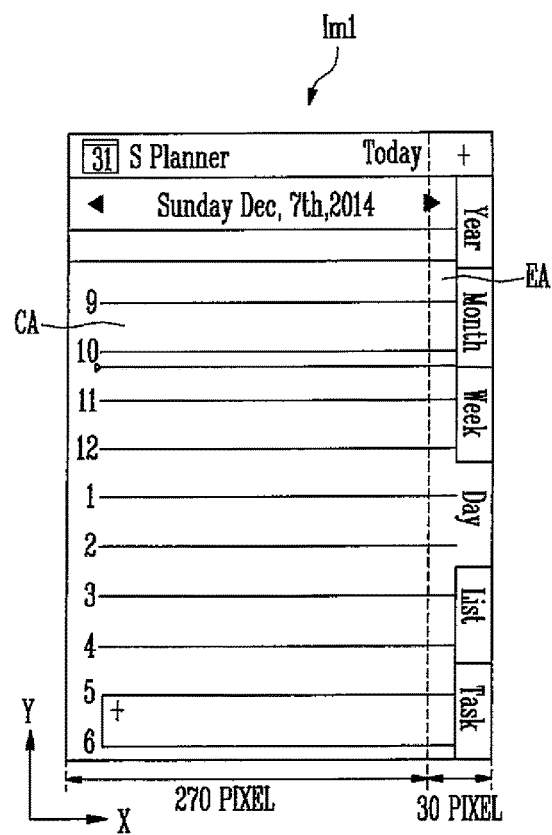

Referring to FIG. 5B, X axis of the first image Im1 may be defined as the X-axis expansion area EA and the X-axis reduction area CA based on the X-axis movement amount and the X-axis scaling ratio of the first image Im1. The X-axis scaling ratio may be a value that is set along with the X-axis movement amount.

An area of the X-axis expansion area EA may be determined by multiplying the X-axis movement amount and the X-axis scaling ratio. For example, but without limitation thereto, supposing the X-axis movement amount of the first image Im1 is mx and the X-axis scaling ratio is Sx, the area of the X-axis expansion area EA may be determined by multiplying the X-axis movement amount mx and the scaling ratio Sx.

The X-axis expansion area EA may be expressed as below.

$$EA = |mx \times Sx|$$

The X-axis expansion area EA may be positioned in a direction opposite to the X-axis movement direction of the first image Im1.

For example, but without limitation thereto, supposing the X-axis movement amount of the first image Im1 is less than 0 (that is, if the first image Im1 moves to the left side), the X-axis expansion area EA may be determined by a region having an area |mx×Sx| on the right side of the first image Im1.

The X-axis expansion area EA may be expanded by an area that is as large as the X-axis expansion area EA plus the X-axis movement amount of the first image Im1.

The X-axis reduction area CA may be an area that is not the X-axis expansion area EA. That is, the X-axis reduction area CA may be determined by a region other than an area |mx×Sx| on the right side of the first image Im1. The X-axis reduction area CA may be reduced to an area that is as large as the X-axis reduction area CA minus the X-axis movement amount of the first image Im1.

The first image Im1 may move three (3) pixels to the left direction, and when the X-axis scaling ratio is 10, the area of the X-axis expansion area EA may be three (3) pixels times 10=30 pixels. Because the X-axis expansion area EA may be positioned in a direction opposite to the X-axis movement direction of the first image Im1, 30 pixels on the right side of the first image Im1 may be determined as the X-axis expansion area EA, and an area except for the 30 pixels on the right side may be determined as the reduction area CA.

For example, but without limitation thereto, if the X axis of the first image Im1 is 300 pixels, 270 pixels on the left side may be determined as the X-axis reduction area CA. However, a method of dividing the X-axis expansion area EA and the X-axis reduction area CA of the first image Im1 is not limited thereto.

In the step of defining the Y-axis expansion area and the Y-axis reduction area (S130), the Y axis of the first image Im1 may be defined as the Y-axis expansion area and the Y-axis reduction area of the first image Im1 based on the Y-axis movement amount and the Y-axis scaling ratio.

The Y-axis expansion area of the second image Im2 may be expanded by an area that is as large as the Y-axis expansion area of the first image Im1 plus the Y-axis movement amount, and the Y-axis reduction area of the second image Im2 may be reduced to an area that is as large as the Y-axis reduction area of the first image Im1 minus the Y-axis movement amount.

The step of defining the Y-axis expansion area and the Y-axis reduction area (S130) may be performed by the Y-axis area defining unit 330 as described above.

Although FIGS. 5A to 5D illustrate a case in which the Y-axis movement amount is 0, if there is Y-axis movement amount, the step (S130) may be performed in the same manner as the step of defining the X-axis expansion area and the X-axis reduction area (S120) as described above.

In the step of generating the X image coordinate and the Y image coordinate (S140), the X image coordinate and the Y image coordinate of the values that are included in the first image data Di1 may be generated.

For example, but without limitation thereto, if the first image Im1 is displayed on the display panel 110 having 300*700 resolution, 300 X image coordinates and 700 Y image coordinates may be generated for the first image data Di1. The number of the X image coordinates and the number of the Y image coordinates of the first image data Di1 are not limited thereto.

The step of generating the X image coordinate and the Y image coordinate (S140) may be performed by the coordinate generator 340 as described above.

Figure 5C:
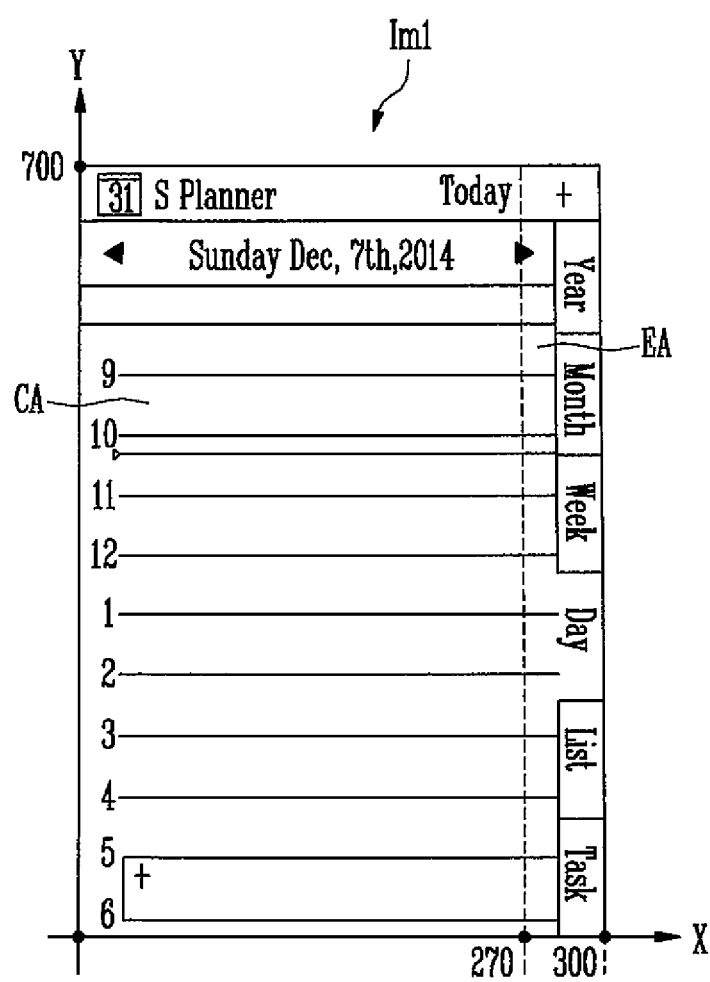

Referring to FIG. 5C, the image coordinate of the first image data Di1 for implementing the first image Im1 may be generated.

For example, but without limitation thereto, if the first image Im1 is displayed on the display panel 110 having 300*700 resolution, 300 X image coordinates and 700 Y image coordinates may be generated for the first image data Di1.

That is, the first image data may include 300 coordinates on the X axis and 700 coordinates on the Y axis.

Because the X-axis expansion area EA of the first image Im1 as defined in FIG. 5B includes 30 pixels on the right side of the first image Im1, it may correspond to the X image coordinates 270 to 300 of the first image data Di1.

Because the X-axis reduction area CA of the first image Im1 includes 270 pixels on the left side of the first image Im1, it may correspond to the X coordinates 0 to 270 of the first image data Di1.

In the step of computing the X correction coordinates (S150), X correction coordinates may be computed by applying a different mathematical formula depending on where the X image coordinate of a certain value included in the first image data Di1 is positioned, where in the X-axis expansion area or in the X-axis reduction area.

For example, but without limitation thereto, if the X image coordinate is positioned in the X-axis expansion area, the X correction coordinate may be computed using a first mathematical formula, and if the X image coordinate is positioned in the X-axis reduction area, the X correction coordinate may be computed using a second mathematical formula.

The step of computing the X correction coordinate (S150) may be performed by the X coordinate correcting unit 350 as described above.

Referring to FIG. 5C, if the X image coordinate of a certain value that is included in the first image data Di1 is positioned in the X-axis expansion area EA, the X correction coordinate may be computed by the first mathematical formula as below.

$$x2 = (x1 - (L + Sx \times mx)) \times \frac{|Sx \times mx + mx|}{|Sx \times mx|} + \quad \text{First mathematical formula}$$
$$(L + (Sx \times mx + mx))$$

The X-axis movement amount of the first image Im1 may be defined as mx, the X-axis scaling ratio as Sx, the X-axis length of the first image data Di1 as L, the X image coordinate as x1, and the X correction coordinate as x2.

In the first mathematical formula, the X-axis length L of the first image data Di1 may be represented as the X coordinate of the first image data Di1. For example, but without limitation thereto, supposing the X-axis movement amount of the first image Im1 is −3, the X-axis scaling ratio is 10, the X-axis length of the first image data Di1 is 300, and the X image coordinate of a certain value that is included in the first image data Di1 is 295, the X correction coordinate may be 294.5 according to the first mathematical formula.

Eventually, the X correction coordinate may be 295 by going through a series of decimal point handling processes (for example, rounding off to the nearest integer or rounding up). In another embodiment, eventually, the X correction coordinate may be 294 by going through different decimal point handling processes (for example, rounding down).

Because the X-axis expansion area EA is an area in which an area will expand in the X-axis direction in the second image Im2, there may be more X correction coordinates that are computed through the first mathematical formula than the X image coordinates.

For example, but without limitation thereto, one X image coordinate may correspond to at least two X correction coordinates.

In a similar way, the X correction coordinates that correspond to all X image coordinates of the values of the first image data Di1 positioned in the X-axis expansion area EA of the first image Im1 may be computed.

If the X image coordinate of a certain value that is included in the first image data Di1 is positioned in the X-axis reduction area CA, the X correction coordinate may be computed through a second mathematical formula as below.

$$x2 = x1 \times \frac{|L + (Sx \times mx + mx)|}{|L + (Sx \times mx)|} \quad \text{Second mathematical formula}$$

The X-axis movement amount of the first image Im1 may be defined as mx, the X-axis scaling ratio as Sx, the X-axis length of the first image data Di1 as L, the X image coordinate as x1, and the X correction coordinate as x2.

In the second mathematical formula, the X-axis length L of the first image data Di1 may be represented as the X coordinate of the first image data Di1. For example, but without limitation thereto, supposing the X-axis movement amount of the first image Im1 is −3, the X-axis scaling ratio is 10, the X-axis length of the first image data is 300, and the X image coordinate of a certain value that is included in the first image data Di1 is 100, the X correction coordinate may be 98.8 by the second mathematical formula.

The X correction coordinate may eventually be 99 by going through a series of decimal point handling processes (for example, rounding off to the nearest integer or rounding up). In another embodiment, the X correction coordinate may eventually be 98 by going through different decimal point handling process (for example, rounding down).

Because the X-axis reduction area CA may be reduced to an area reduced in the X-axis direction in the second image Im2, there may be fewer X correction coordinates that are computed through the second mathematical formula than the X image coordinates.

For example, at least two X image coordinates may correspond to one X correction coordinate.

In order to prevent a phenomenon in which mapping process from repeating itself that is subsequently performed by the image data generator 370, one of the X correction coordinates may be set to correspond to any one of the X image coordinates among the at least two X image coordinates.

In this way, the X correction coordinates that correspond to all X image coordinates of the values of the first image data Di1 positioned in the X-axis reduction area CA of the first image Im1 may be computed.

Although a certain mathematical formula is given as an example for the first mathematical formula and the second mathematical formula, the first and second mathematical formulae are not limited thereto.

In the step of computing the Y correction coordinate (S160), depending on where the Y image coordinate of a certain value that is included in the first image data Di1 is positioned, whether in the Y-axis expansion area or in the Y-axis reduction area, a different mathematical formula may be applied to compute the Y correction coordinate.

For example, but without limitation thereto, if the Y image coordinate is positioned in the Y-axis expansion area, the Y correction coordinate may be computed using a third mathematical formula, and if the Y image coordinate is positioned in the Y-axis reduction area, the Y correction coordinate may be computed using a fourth mathematical formula.

The step of computing the Y correction coordinate (S160) may be performed by the Y coordinate correcting unit 360 as described above.

Because FIGS. 5A to 5D illustrate a case in which the Y-axis movement amount is 0, the Y correction coordinate may be maintained the same as the Y image coordinate.

In another embodiment, if there is the Y-axis movement amount, the step (S160) may be performed in the same manner as the step of computing the X correction coordinate (S150) as described above.

For example, but without limitation thereto, the third mathematical formula may be set in the same manner as the first mathematical formula as below.

$$y2 = (y1 - (L + Sy \times my)) \times \frac{|Sy \times my + my|}{|Sy \times my|} + \quad \text{Third mathematical formula}$$
$$(L + (Sy \times my + my))$$

The fourth mathematical formula may be set in the same manner as the second mathematical formula as below.

$$y2 = y1 \times \frac{|L + (Sy \times my + my)|}{|L + (Sy \times my)|} \quad \text{Fourth mathematical formula}$$

The Y-axis movement amount of the first image Im1 may be defined as my, the Y-axis scaling ratio as Sy, the Y-axis length of the first image data Di1 as L, the Y image coordinate as y1, and the Y correction coordinate as y2.

In the step of generating the second image data (S170), by mapping a value that is included in the first image data Di1 to a correction coordinate consisting of or comprising the X correction coordinate ad the Y correction coordinate, the second image data Di2 may be generated.

The step of generating the second image data (S170) may be performed by the image data generator 370 as described above.

For example, but without limitation thereto, if the X correction coordinate x2 is computed from the X image coordinate x1 and the Y correction coordinate y2 is computed from the Y image coordinate y1, the value of the first image data Di1 that corresponds to the image coordinates (x1, x2) may b mapped to the correction coordinates (x2, y2).

In a similar way, by converting the image coordinates of all values that are included in the first image data Di1 into the correction coordinates and mapping the values that are included in the first image data Di1 to each of the correction coordinates, the second image data Di2 consisting of or comprising the values that are mapped to the correction coordinate may be generated.

Referring to FIG. 5D, the second image Im2 that is modified from the first image Im1 may be displayed on the display panel 110. The second image Im2 may be implemented by the second image data Di2.

The X-axis expansion area EA of the first image Im1 may expand into a X-axis expansion area EA' of the second image Im2.

That is, the first image data Di1 that is positioned in the X-axis expansion area EA of the first image Im1 may be expanded and converted into the second image data Di2 that is positioned in the X-axis expansion area EA' of the second image Im2.

The X-axis reduction area CA of the first image Im1 may be reduced to a X-axis reduction area CA' of the second image Im2.

That is, the first image data Di1 that is positioned in the X-axis reduction area CA of the first image Im1 may be reduced and converted into the second image data Di2 that is positioned in the X-axis reduction area CA' of the second image Im2.

For example, but without limitation thereto, when the first image Im1 may move three (3) pixels to the left side and the X-axis scaling ratio is 10, the first image data Di1 that is positioned in the 30 pixels on the right side of the X-axis expansion area EA of the first image Im1 may be expanded and displayed on 33 pixels on the right side of the second image Im2.

As the first image Im1 moves three (3) pixels to the left side, a blank area that occurs in the three (3) pixels on the right side of the display panel 110 may disappear.

When the first image Im1 is moved and displayed, by expanding the X-axis expansion area EA of the first image Im1 by the X-axis movement amount and displaying it, a blank area phenomenon occurring on the display panel 110 may be corrected.

The first image data Di1 that is positioned in the 270 pixels on the left side of the X-axis reduction area CA of the first image Im1 may be reduced and displayed on 267 pixels on the left side of the second image Im2.

Therefore, as the first image im1 moves three (3) pixels to the left side, the phenomenon in which the three (3) pixels on the left side of the first image Im1 disappears from the display panel 110 may be prevented.

When the first image Im1 is moved and displayed, by reducing the X-axis reduction area CA of the first image Im1 to as much as the X-axis movement amount and displaying it, the phenomenon in which a portion of the first image im1 disappears from the display panel 110 may be corrected.

Although an example in which the first image Im1 is moved in the X-axis direction is described in a method of correcting image, the movement direction of the first image Im1 is not limited thereto. That is, the first image Im1 may move in the Y-axis direction and may move to the X-axis and Y-axis directions.

As describe above, in order to prevent afterimage phenomenon, the method of driving the touch screen display device may generate the second image data Di2 that implements the second image Im2 that is corrected from the first image Im1, thereby preventing image from being lost on the display panel 110.

Figure 6:
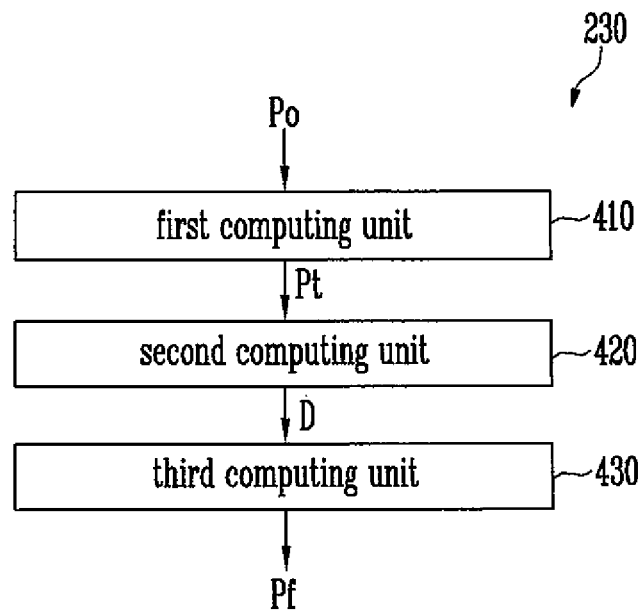
FIG. 6 illustrates a touch correcting unit according to embodiments of the present invention.
Figure 7:
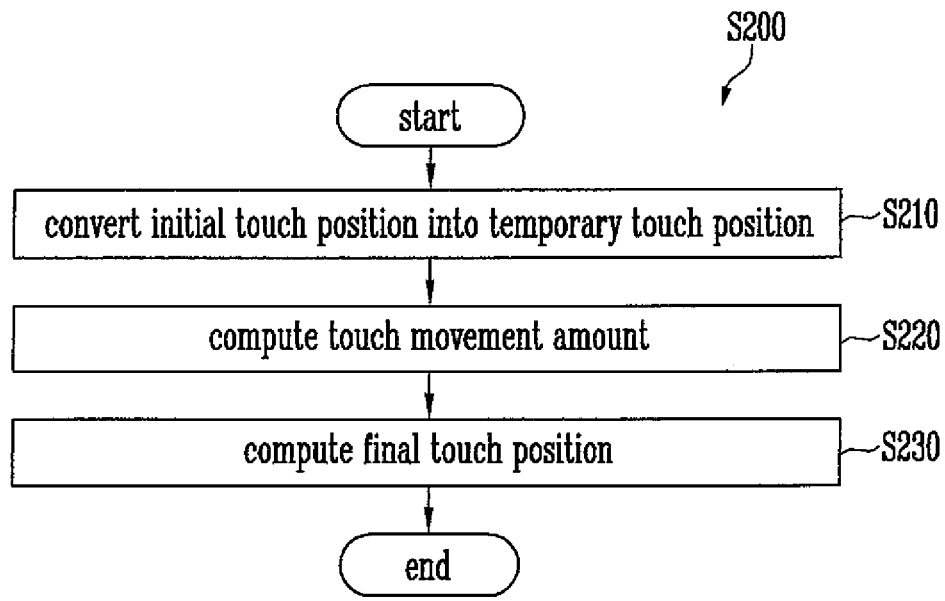
FIG. 7 illustrates a method of correcting touch by the touch correcting unit shown in FIG. 6.
Figure 8:
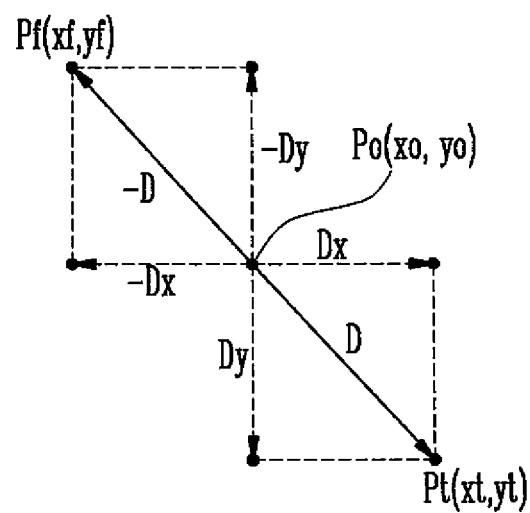
FIG. 8 illustrates an embodiment in which touch correction is performed by the touch correcting method shown in FIG. 7.

FIG. 6 illustrates a touch correcting unit according to an embodiment. FIG. 7 illustrates a method of correcting touch by the touch correcting unit shown in FIG. 6. FIG. 8 illustrates an embodiment in which touch correction is performed by the touch correcting method shown in FIG. 7.

Referring to FIG. 6, the touch correcting unit 230 according to an embodiment may include a first computing unit 410, a second computing unit 420 and a third computing unit 430.

The first computing unit 410 may convert the initial touch position Po computed by the touch controller 220 into a temporary touch position Pt.

For example, but without limitation thereto, the first computing unit 410 may compute a X temporary coordinate of the temporary touch position Pt from the X initial coordinate o the initial touch position Po and compute a Y temporary coordinate of the temporary touch position Pt from the Y initial coordinate o the initial touch position Po. (In order to differentiate from other coordinates, the X coordinate and the Y coordinate of the initial touch position Po may be referred to as a X initial coordinate and a Y initial coordinate, respectively, and the X coordinate and the Y coordinate of the temporary touch position Pt may be referred to as a X temporary coordinate and a Y temporary coordinate, respectively.)

If the X initial coordinate of the initial touch position Po is positioned in the X-axis expansion area EA (refer to FIG. 5B) of the first image Im1, the first computing unit 410 may compute the X temporary coordinate of the temporary touch position Pt using the first mathematical formula. If the X initial coordinate of the initial touch position Po is positioned in the X-axis reduction area CA (refer to FIG. 5B) of the first image Im1, the first computing unit 410 may compute the X temporary coordinate of the temporary touch position Pt using the second mathematical formula.

If the Y initial coordinate of the initial touch position Po is positioned in the Y-axis expansion area of the first image Im1, the first computing unit 410 may compute the Y temporary coordinate of the temporary touch position Pt using the third mathematical formula. If the Y initial coordinate of the initial touch position Po is positioned in the Y-axis reduction area of the first image Im1, the first computing unit 410 may compute the Y temporary coordinate of the temporary touch position Pt using the fourth mathematical formula.

In order to accurately reflect the movement amount of the first image Im1, the first computing unit 410 may use the same mathematical formula as the mathematical formula used by the X coordinate correcting unit 350 and the Y coordinate correcting unit 360.

The second computing unit 420 may compute a touch movement amount D between the initial touch position Po and the temporary touch position Pt.

For example, but without limitation thereto, the second computing unit 420 may compute a X-axis touch movement amount Dx between the X initial coordinate of the initial touch position Po and the X temporary coordinate of the temporary touch position Pt and may compute a Y-axis touch movement amount Dy between the Y initial coordinate of the initial touch position Po and the Y temporary coordinate of the temporary touch position Pt.

The third computing unit 430 may compute a final touch position Pf by subtracting the touch movement amount D from the initial touch position Po.

For example, but without limitation thereto, the third computing unit 430 may compute the X final coordinate of the final touch position Pf by subtracting the X-axis touch movement amount Dx from the X initial coordinate of the initial touch position Po and may compute the Y final coordinate of the final touch position Pf by subtracting the Y-axis touch movement amount Dy from the Y initial coordinate of the initial touch position Po. For distinguishing purposes from other coordinates, the X coordinate and the Y coordinate of the final touch position Pf may be referred to as the X final coordinate and the Y final coordinate, respectively.

Although FIG. 6 illustrates the first computing unit 410, the second computing unit 420 and the third computing unit 430 as separate components, at least two computing units may be integrated into one component in another embodiment.

Referring to FIG. 7, the step of correcting the initial touch position Po detected by the touch sensor 210 to the final touch position Pf (S200) may include the step of converting the initial touch position Po into the temporary touch position Pt (S210), the step of computing the touch movement amount D (S220) and the step of computing the final touch position Pf (S230).

The step (S200) may be performed after the step of converting the first image data Di1 into the second image data Di2 (S100) as described above.

In the event of the step of converting the initial touch position Po into the temporary touch position Pt, the initial touch position Po detected by the touch sensor 210 may be converted into the temporary touch position Pt.

The step (S210) may be performed by the first computing unit 410 as described above.

Referring to FIG. 8, a X temporary coordinate xt of the temporary touch position Pt may be computed from a X initial coordinate xo of the initial touch position Po, and a Y temporary coordinate yt of the temporary touch position Pt may be computed from a Y initial coordinate yo of the initial touch position Po.

When calculating the X temporary coordinate xt, the first and second mathematical formulae may be used in the step of computing the X correction coordinate (S150).

If the X initial coordinate xo of the initial touch position Po is positioned in the X-axis expansion area EA of the first image Im1, the X temporary coordinate xt of the temporary touch position Pt may be computed using the first mathematical formula. A X image coordinate x1 and a X correction coordinate x2 may be substituted by the X initial coordinate xo and the X temporary coordinate xt, respectively, in the first mathematical formula.

The first mathematical formula may be modified as follows:

$$xt = (xo - (L + Sx \times mx)) \times \frac{|Sx \times mx + mx|}{|Sx \times mx|} + (L + (Sx \times mx + mx))$$

If the X initial coordinate xo of the initial touch position Po is positioned in the X-axis reduction area CA of the first image Im1, the X temporary coordinate xt of the temporary touch position Pt may be computed using the second mathematical formula. The X image coordinate x1 and the X correction coordinate x2 may be substituted with the X initial coordinate xo and the X temporary coordinate xt, respectively, in the second mathematical formula.

The second mathematical formula may be modified as follows:

$$xt = xo \times \frac{|L + (Sx \times mx + mx)|}{|L + (Sx \times mx)|}$$

When the Y temporary coordinate yt is computed, the third and fourth mathematical formulae that were used in the step of computing the Y correction coordinate (S160) may be used.

If the Y initial coordinate yo of the initial touch position Po is positioned in the Y-axis expansion area of the first image Im1, the Y temporary coordinate yt of the temporary touch position Pt may be computed using the third mathematical formula. The Y image coordinate y1 and the Y correction coordinate y2 may be substituted with the Y initial coordinate yo and the Y temporary coordinate yt, respectively, in the third mathematical formula.

The third mathematical formula may be modified as follows:

$$yt = (yo - (L + Sy \times my)) \times \frac{|Sy \times my + my|}{|Sy \times my|} + (L + (Sy \times my + my))$$

If the Y initial coordinate yo of the initial touch position Po is positioned in the Y-axis reduction area of the first image Im1, the Y temporary coordinate yt of the temporary touch position Pt may be computed using the fourth mathematical formula. The Y image coordinate y1 and the Y correction coordinate y2 may be substituted with the Y initial coordinate yo and the Y temporary coordinate yt, respectively, in the fourth mathematical formula.

$$yt = yo \times \frac{|L + (Sy \times my + my)|}{|L + (Sy \times my)|}$$

In the step of computing the touch movement amount D (S220), the touch movement amount D between the initial touch position Po and the temporary touch position Pt may be computed.

The step (S220) may be performed by the second computing unit 420 as described above.

Referring to FIG. 8, the X-axis touch movement amount Dx between the X initial coordinate xo of the initial touch position Po and the X temporary coordinate xt of the temporary touch position Pt may be computed, and the Y-axis touch movement amount Dy between the Y initial coordinate yo of the initial touch position Po and the Y temporary coordinate yt of the temporary touch position Pt may be computed.

In the step of computing the final touch position Pf (S230), the final touch position Pf may be computed by subtracting the touch movement amount D from the initial touch position Po.

The step (S230) may be performed by the third computing unit 430 as described above.

Referring to FIG. 8, the X final coordinate xf of the final touch position Pf may be computed by subtracting the X-axis touch movement amount Dx from the X initial coordinate xo of the initial touch position Po, and the Y final coordinate yf of the final touch position Pf may be computed by subtracting the Y-axis touch movement amount Dy from the Y initial coordinate yo of the initial touch position Po.

For example, but without limitation thereto, suppose the final touch position Pf in the first image Im1 is a spot where touch needs to be made by the user.

Here, in order to prevent afterimage phenomenon from occurring, if the first image Im1 is moved and displayed (e.g., move according to the touch movement amount D), the user may touch the initial touch position Po, not the final touch position Pf, as the first image Im1 moves.

Here, if the initial touch position Po is not corrected to the final touch position Pf, the display device may not provide a feedback regarding the user's touch.

Because the initial touch position Po may be corrected to the final touch position Pf through the above-described process in an embodiment, errors in touch perception may be reduced, and proper feedback may be provided to the user.

By way of summation and review, functions of display devices may deteriorate as certain pixels are degraded due to long driving time.

For example, but without limitation thereto, digital information display devices used for transferring information in public places and the like tend to continuously output certain images or characters for a long time. Here, deterioration in certain pixels may accelerate and afterimage phenomenon may occur.

In order to solve the problem, a technology for moving the images in regular cycles and displaying them on the display panel (i.e., pixel shift technology) may be used. If images are moved and displayed on the display panel in regular cycles, deterioration in certain pixel may be improved by preventing the same data from being output via certain pixel for a long time.

If a touch screen display device having a touch sensor uses the above-described pixel shift technology, the user will perform touch operations by looking at the images that move in certain directions.

However, touch may be perceived in a state in which no consideration iss given to movement of images, and as a result, there may be errors in which touch is perceived differently from touch actually intended by the user.

According to embodiments of the present invention, therefore, a touch screen display device and a method for driving the same may be capable of enhancing accuracy in touch perception.

The touch screen display device and/or any other relevant devices or components according to embodiments of the present invention described herein may be implemented utilizing any suitable hardware, firmware (e.g. an application-specific integrated circuit), software, or a combination of software, firmware, and hardware. For example, the various components of the [device] may be formed on one integrated circuit (IC) chip or on separate IC chips. Further, the various components of the touch screen display device may be implemented on a flexible printed circuit film, a tape carrier package (TCP), a printed circuit board (PCB), or formed on a same substrate as the [device]. Further, the various components of the touch screen display device may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. A touch screen display device, comprising:
   a display panel;
   a display driver configured to display a first image on the display panel using first image data and to display a second image on the display panel using second image data;
   an image correcting unit configured to convert the first image data into the second image data, the image correcting unit comprising:
     a coordinate generator configured to generate an X image coordinate and a Y image coordinate of values included in the first image data;
     an X-axis area defining unit configured to divide an X axis of the first image into an X-axis expansion area and an X-axis reduction area; and
     an X coordinate correcting unit configured to compute an X correction coordinate using a first mathematical formula if the X image coordinate is positioned in the X-axis expansion area and compute an X correction coordinate using a second mathematical formula if the X image coordinate is positioned in the X-axis reduction area;
   a touch sensor;
   a touch controller configured to detect a position touched on the touch sensor; and
   a touch correcting unit configured to correct an initial touch position detected by the touch controller to a final touch position,
   wherein the touch correcting unit comprises:
     a first computing unit configured to convert the initial touch position to a temporary touch position;

a second computing unit configured to compute a touch movement amount between the initial touch position and the temporary touch position; and a third computing unit configured to compute the final touch position by subtracting the touch movement amount from the initial touch position.

2. The touch screen display device of claim 1,
wherein the first computing unit is configured to compute an X temporary coordinate of the temporary touch position based on an X initial coordinate of the initial touch position and to compute a Y temporary coordinate of the temporary touch position based on a Y initial coordinate of the initial touch position,
wherein the second computing unit is configured to compute a X-axis touch movement amount between the X initial coordinate of the initial touch position and the X temporary coordinate of the temporary touch position and to compute a Y-axis touch movement amount between the Y initial coordinate of the initial touch position and the Y temporary coordinate of the temporary touch position, and
wherein the third computing unit is configured to compute an X final coordinate of the final touch position by subtracting the X-axis touch movement amount from the X initial coordinate of the initial touch position and to compute a Y final coordinate of the final touch position by subtracting the Y-axis touch movement amount from the Y initial coordinate of the initial touch position.

3. The touch screen display device of claim 1, wherein the image correcting unit further comprises:
a Y-axis area defining unit configured to divide a Y-axis of the first image into a Y-axis expansion area and a Y-axis reduction area; and
a Y coordinate correcting unit configured to compute a Y correction coordinate using a third mathematical formula if the Y image coordinate is positioned in the Y-axis expansion area and compute a Y correction coordinate using a fourth mathematical formula if the Y image coordinate is positioned in the Y-axis reduction area.

4. The touch screen display device of claim 3, wherein the image correcting unit further comprises an image data generator configured to generate the second image by mapping a value of the first image to a correction coordinate comprising the X correction coordinate and the Y correction coordinate, the value of the first image corresponding to the correction coordinate.

5. The touch screen display device of claim 4, wherein the image correcting unit further comprises a movement amount determining unit configured to determine an X-axis movement amount, a Y-axis movement amount, an X-axis scaling ratio and a Y-axis scaling ratio of the first image.

6. The touch screen display device of claim 4, wherein the first computing unit is configured to compute the X temporary coordinate of the temporary touch position using the first mathematical formula if the X initial coordinate of the initial touch position is positioned in the X-axis expansion area, to compute the X temporary coordinate of the temporary touch position using the second mathematical formula if the X initial coordinate of the initial touch position is in the X-axis reduction area, to compute the Y temporary coordinate of the temporary touch position using the third mathematical formula if the Y initial coordinate of the initial touch position is in the Y-axis expansion area, and to compute the Y temporary coordinate of the temporary touch position using the fourth mathematical formula if the Y initial coordinate of the initial touch position is in the Y-axis reduction area.

7. The touch screen display device of claim 5,
wherein the X-axis defining unit is configured to divide the X axis of the first image into the X-axis expansion area and the X-axis reduction area of the first image based on the X-axis movement amount and the X-axis scaling ratio,
wherein the Y-axis defining unit is configured to divide the Y axis of the first image into the Y-axis expansion area and the Y-axis reduction area of the first image based on the Y-axis movement amount and the Y-axis scaling ratio.

8. The touch screen display device of claim 7,
wherein the X-axis expansion area is determined by multiplying the X-axis movement amount and the X-axis scaling ratio,
wherein the X-axis reduction area is an area that is not the X-axis expansion area,
wherein the Y-axis expansion area is determined by multiplying the Y-axis movement amount and the Y-axis scaling ratio,
wherein the Y-axis reduction area is an area that is not the Y-axis expansion area.

9. The touch screen display device of claim 1,
wherein the image correcting unit further comprises a memory configured to store the first image data.

10. The touch screen display device of claim 1,
wherein the X coordinate correcting unit is configured to compute the X correction coordinates that are more in number than the X image coordinates using the first mathematical formula if the X image coordinate is positioned in the X-axis expansion area and to compute the X correction coordinates that are fewer in number than the X image coordinates using the second mathematical formula if the X image coordinate is positioned in the X-axis reduction area; and
wherein the Y coordinate correcting unit is configured to compute the Y correction coordinates that are more in number than the Y image coordinates using the third mathematical formula if the Y image coordinate is positioned in the Y-axis expansion area and to compute the Y correction coordinates that are fewer in number than the Y image coordinates using the fourth mathematical formula if the Y image coordinate is positioned in the Y-axis reduction area.

11. A method of driving a touch screen display device, the method comprising:
converting first image data for implementing a first image into second image data; and
correcting an initial touch position detected by a touch sensor to a final touch position,
wherein the converting the first image data into the second image data comprises:
determining an X-axis movement amount, a Y-axis movement amount, an X-axis scaling ratio, and a Y-axis scaling ratio of the first image;
defining an X axis of the first image into a X-axis expansion area and a X-axis reduction area based on the X-axis movement amount and the X-axis scaling ratio;
defining a Y axis of the first image into a Y-axis expansion area and a Y-axis reduction area based on the Y-axis movement amount and the Y-axis scaling ratio;
generating an X image coordinate and a Y image coordinate of values included in the first image data;

computing an X correction coordinate using a first mathematical formula if the X image coordinate is positioned in the X-axis expansion area and computing a X correction coordinate using a second mathematical formula if the X image coordinate is positioned in the X-axis reduction area;

computing a Y correction coordinate using a third mathematical formula if the Y image coordinate is positioned in the Y-axis expansion area and computing a Y correction coordinate using a fourth mathematical formula if the Y image coordinate is positioned in the Y-axis reduction area; and generating the second image data by mapping a value of the first image data to a correction coordinate comprising the X correction coordinate and the Y correction coordinate, the value of the first image corresponding to the correction coordinate.

12. The method of claim 11, wherein the correcting the initial touch position to the final touch position comprises:

computing an X temporary coordinate of the temporary touch position from an X initial coordinate of the initial touch position and computing a Y temporary coordinate of the temporary touch position from a Y initial coordinate of the initial touch position;

computing an X-axis touch movement amount between the X initial coordinate of the initial touch position and the X temporary coordinate of the temporary touch position and computing a Y-axis touch movement amount between the Y initial coordinate of the initial touch position and the Y temporary coordinate of the temporary touch position; and computing an X final coordinate of the final touch position by subtracting the X-axis touch movement amount from the X initial coordinate of the initial touch position and computing a Y final coordinate of the final touch position by subtracting the Y-axis touch movement amount from the Y initial coordinate of the initial touch position.

13. The method of claim 12, wherein the computing the X temporary coordinate and the Y temporary coordinate of the temporary touch position comprises computing the X temporary coordinate of the temporary touch position using the first mathematical formula if the X initial coordinate of the initial touch position is positioned in the X-axis expansion area, computing the X temporary coordinate of the temporary touch position using the second mathematical formula if the X initial coordinate of the initial touch position is in the X-axis reduction area, computing the Y temporary coordinate of the temporary touch position using the third mathematical formula if the Y initial coordinate of the initial touch position is in the Y-axis expansion area, and computing the Y temporary coordinate of the temporary touch position using the fourth mathematical formula if the Y initial coordinate of the initial touch position is in the Y-axis reduction area.

14. The method of claim 13,
wherein the X-axis expansion area is determined by multiplying the X-axis movement amount and the X-axis scaling ratio,
wherein the X-axis reduction area is an area that is not the X-axis expansion area,
wherein the Y-axis expansion area is determined by multiplying the Y-axis movement amount and the Y-axis scaling ratio,
wherein the Y-axis reduction area is an area that is not the Y-axis expansion area.

15. The method of claim 11,
wherein the X correction coordinates computed from X image coordinates positioned in the X-axis expansion area are more in number than the X image coordinates positioned in the X-axis expansion area,
wherein the X correction coordinates computed from the X image coordinates positioned in the X-axis reduction area are fewer than the X image coordinates positioned in the X-axis reduction area.

16. The method of claim 15, wherein the computing the Y correction coordinate comprises computing the Y correction coordinates that are more in number than the Y image coordinates using the third mathematical formula if the Y image coordinate is positioned in the Y-axis expansion area and computing the Y correction coordinates that are fewer in number than the Y image coordinates using the fourth mathematical formula if the Y image coordinate is positioned in the Y-axis reduction area.

* * * * *